3,051,595
NON-AQUEOUS PHOSPHATIZING SOLUTION
Lawrence Fullhart, Jr., and Donald A. Swalheim, New Castle, Del., assignors to E. I. du Pont de Nemours and Company, Wilmington, Del., a corporation of Delaware
No Drawing. Filed Jan. 12, 1961, Ser. No. 82,159
8 Claims. (Cl. 148—6.15)

The present invention relates to the stabilization of chlorohydrocarbons, particularly trichloroethylene and perchloroethylene. More particularly this invention relates to the stabilization of chlorohydrocarbon solvents employed in a substantially non-aqueous phosphatizing bath against the formation of corrosive chlorides.

Chlorohydrocarbon compounds are extensively employed as solvents in industrial applications such as, for example, in metal cleaning and degreasing operations. It is well recognized that chlorohydrocarbons as commercially produced are unstable and stabilizers have been universally employed to retard decomposition of these materials as a result of prolonged exposure thereof to moisture, light, heat, and air.

More recently, non-aqueous phosphatizing systems employing chlorohydrocarbon solvents have been developed as a desired means of applying phosphate coatings to metallic surfaces to reduce corrosion and improve paint adhesion. These systems involve a phosphatizing bath comprising a chlorohydrocarbon solvent as a primary component with a phosphatizing amount of orthophosphoric acid and such an amount of an agent as will solubilize the amount of phosphoric acid. Phosphatizing systems utilizing such a bath offer several advantages over the more conventional aqueous phosphatizing processes in that the corrosive influences of water on the workpieces may be avoided and the number of essential processing steps can be reduced to effect a significant economy in operating and equipment costs.

It has been found, however, that the chlorohydrocarbon solvent in such a non-aqueous phosphatizing bath, particularly where the phosphatizing is carried out in metal units, undergoes rapid decomposition resulting in the formation of excessive amounts of corrosive chlorides. Although the decomposition mechanism involved under these highly acidic conditions is not fully understood, it is apparently entirely different from the usual oxidative type of decomposition referred to above and the stabilizers heretofore used in the stabilization of chlorohydrocarbons are found to be unsatisfactory in inhibiting the chlorohydrocarbon against such attack.

It is, therefore, the object of the present invention to offer an agent which will effectively stabilize chlorohydrocarbon solvents in acidic conditions.

It is a further object of the present invention to provide an agent which will effectively stabilize a chlorohydrocarbon employed in a non-aqueous phosphatizing bath against the formation of corrosive chlorides.

The above objects and other objects which will become clear from the following description are accomplished by adding to a non-aqueous phosphatizing bath employing a chlorohydrocarbon solvent compound a small amount of a stabilizing agent selected from the group consisting of nitroso and azo aromatic compounds. The terms "nitroso aromatic" and "azo aromatic compounds" as used herein are intended to embrace cyclic organic compounds broadly which exhibit aromatic character substituted with nitroso or azo functions respectively. The compounds may be mononuclear or polynuclear and may contain various substituent groups other than the required nitroso or azo groups. The aromatic character of these compounds is due preferably to the presence of the benzene nucleus or nuclei, as the case may be, but may also be due to a carbocyclic nucleus or nuclei other than benzene like indene or to a heterocyclic nucleus or nuclei such as a pyridine or thiophene alone or in combination with a benzene nucleus or nuclei which are known to exhibit aromatic character.

Non-limiting examples of nitroso aromatic compounds suitable in the present invention include 5-nitroso-2-aminoanisole, p - nitrosodimethylaniline, 1 - nitroso-2-naphthol, N-nitrosodiphenylamine, p-nitrosophenol, and 5-nitroso-8-quinolinol.

Non-limiting examples of azo aromatic compounds suitable in the present invention include azobenzene, azoxybenzene, 3,3-dinitroazoxybenzene, and 1-o-nitrophenylazonaphthylamine.

The chlorohydrocarbon solvent forms the major proportion of the phosphatizing bath. The term chlorohydrocarbon solvent as used herein includes, in addition to the preferred solvents trichloroethylene and perchloroethylene, chloro substituted hydrocarbon solvents having 1 to 3 carbon atoms. Representative of additional solvents are methylene chloride, methyl chloroform, carbon tetrachloride, 1,1,2-trichloropropane, and 1,2,3-trichloropropane. The amount of the chlorohydrocarbon solvent in the phosphatizing bath is not critical. Usually the amount will be at least 85% by weight.

For an effective phosphatizing amount of phosphoric acid, at least 0.05% by weight of the acid should be present to develop a phosphate coating and preferably between 0.3 and 1% of the acid is present. Amounts up to 7.5% by weight may be used. Commercial orthophosphoric acid contains a small amount of water but the phosphatizing baths hereof are nevertheless homogeneous. These homogeneous single-phase solutions containing small amount of water are substantially non-aqueous in nature and are so referred to herein.

Since phosphoric acid is not sufficiently soluble in the chlorohydrocarbon to introduce an effective phosphatizing amount of acid, a solubilizing agent must be employed. Illustrative examples of agents which may be used for this purpose are alkyl acid phosphate compounds and lower molecular weight aliphatic alcohols, particularly such compounds containing from 3 to 8 carbon atoms. Illustrative examples of the latter are n-propanol, isopropanol, n-butanol, isobutanol, sec-butanol, n-amyl alcohol, pentanol-2, isoamyl alcohol, n-hexanol, n-octanol, and the like. Based on the foregoing stated range of phosphoric acid, an amount of the alcohol in the range from 1 to 10% by weight base on the total weight of the bath is preferred.

A preferred process for utilizing the above described non-aqueous phosphatizing baths to apply phosphate coatings to metal surfaces with a full description of process conditions and equipment is disclosed in copending application S.N. 795,588, filed February 26, 1959, now abandoned, which is assigned to our assignee.

The amount of the stabilizing agents hereof required to provide effective stabilization of the chlorohydrocarbon present in the non-aqueous phosphatizing bath is quite small and will vary to some extent with the individual compound. In general an amount between 0.01 and 1% by weight based on the amount of the bath will be preferred although some stabilization occurs even when much lower concentrations are employed. There is no upper limit in concentration but amounts over 5% by weight offer no particular advantage and are not justified economically.

A better understanding of the invention will be gained from the following working examples:

EXAMPLE 1

An accelerated laboratory test was devised to simulate the stabilizing action of various agents of the invention in an actual anhydrous trichloroethylene phosphatizing bath operated at reflux conditions for applying a phosphate coating on metallic surfaces. The base bath composition for this test consisted of 94.5% by weight trichloroethylene, 0.5% by weight phosphoric acid, and 5.0% by weight amyl alcohol as a phosphoric acid solubilizing agent. The trichloroethylene used for the runs reported was a technical grade containing 0.01% by weight pentaphen (para tertiary amyl phenol) and 0.3% by weight diisobutylene as an oxidization stabilizing system. The test was carried out as follows:

To 500 ml. of the bath, maintained at the reflux temperature of the trichloroethylene, 0.1 g. of high purity zinc dust was added. After a period of 10 minutes, the bath was filtered for the removal of the zinc dust and 100 ml. of the bath was separated from the filtrate and mixed thoroughly with an equal volume of water in a separatory funnel. The water layer was then decanted from the liquid mixture and analyzed for water soluble chlorides. The measured result of the test is the amount of chlorides present which is considered to vary proportionately with the degree of trichloroethylene decomposition and corrosivity potential resulting therefrom.

The following table shows the amount of chlorides determined for runs made in accordance with the test procedure for a phosphatizing bath with and without the stabilizing agents of the invention.

Table 1

| Run No. | Stabilizing Agent | Conc. by Weight, Percent | Chlorides, p.p.m. |
| --- | --- | --- | --- |
| 1 | none | | 50 |
| 2 | 5-nitroso-2-aminoanisole | 0.3 | (¹) |
| 3 | p-nitrosodimethylaniline | 0.3 | (¹) |
| 4 | 1-nitroso-2-naphthol | 0.4 | 5 |
| 5 | N-nitrosodiphenylamine | 0.4 | 7 |
| 6 | p-nitrosophenol | 0.4 | 10 |
| 7 | 5-nitroso-8-quinolinol | 0.4 | (¹) |
| 8 | azobenzene | 0.5 | (¹) |
| 9 | azoxybenzene | 0.1 | 5 |
| 10 | 3,3,-dinitroazoxybenzene | 0.2 | (¹) |
| 11 | 1-o-nitrophenylazonaphthylamine | 0.2 | (¹) |

¹ Less than 1.

It will be obvious from the above test that the stabilizing compounds of the invention are significantly effective in inhibiting the formation of corrosive chlorides.

EXAMPLE 2

The test of Example 1 was repeated with the phosphatizing bath of that example in which perchloroethylene containing a conventional oxidation stabilizing system was employed as a chlorohydrocarbon solvent in place of trichloroethylene in the same amounts. A run was conducted with such a phosphatizing bath without a stabilizing agent of the invention and the amount of chlorides was determined to be 50 p.p.m. or comparable to the result obtained with trichloroethylene when a stabilizing agent of the invention was not present. Another run was conducted with the same base phosphatizing bath under identical conditions but containing 0.4% by weight azobenzene and the amount of chlorides was determined to be less than 1 p.p.m.

EXAMPLE 3

Unstabilized tricholroethylene was substituted for the technical grade trichloroethylene in the base composition of Example 1 in the same amounts. The test of Example 1 was repeated for the resulting phosphatizing bath and the amount of chlorides was determined to be 50 p.p.m. The result is the equivalent of the result obtained with the base composition shown in Example 1 and shows that the conventional oxidation stabilizing system of the technical grade trichloroethylene had no significant effect in retarding the decomposition of the chlorohydrocarbon incorporated in the phosphatizing bath.

To the same base phosphatizing composition containing unstabilized trichloroethylene, 0.3% by weight 5-nitroso-8-quinolinol was added and the amount of chloride formed in the test of Example 1 was determined to be 1 p.p.m. In a further run 0.4% by weight azobenzene was added to the same base composition containing unstabilized trichloroethylene and the amount of chlorides formed in the test of Example 1 was determined to be 1 p.p.m. These results show that the agents of the invention offer the same effectiveness in stabilizing action under the acid conditions of the phosphatizing bath in the presence or absence of the conventional oxidation stabilizing system and consequently are not dependent on but compatible with such an additional system.

Since many different embodiments of the invention may be made without departing from the spirit and scope thereof, it is to be understood that the invention is not limited by the specific illustrations except to the extent defined in the following claims.

We claim:

1. A substantially non-aqueous phosphatizing solution consisting essentially of at least 85% by weight of a chlorohydrocarbon selected from the group consisting of trichloroethylene and perchloroethylene, at least 0.05% by weight of phosphoric acid and an amount of a solubilizing agent effective for solubilizing said phosphoric acid in said chlorohydrocarbon to which has been added a stabilizing amount of a compound selected from the group consisting of nitroso aromatic compounds and azo aromatic compounds to minimize the formation of corrosive chlorides.

2. A substantially non-aqueous phosphatizing solution consisting essentially of at least 85% by weight of a chlorohydrocarbon selected from the group consisting of trichloroethylene and perchloroethylene, at least 0.05% by weight of phosphoric acid and an amount of a solubilizing agent effective for solubilizing said phosphoric acid in said chlorohydrocarbon to which has been added a stablizing amount of a nitroso aromatic compound to minimize the formation of corrosive chlorides.

3. A substantially non-aqueous phosphatizing solution consisting essentially of at least 85% by weight of a chlorohydrocarbon selected from the group consisting of trichloroethylene and perchloroethylene, at least 0.05% by weight of phosphoric acid and an amount of a solubilizing agent effective for solubilizing said phosphoric acid in said chlorohydrocarbon to which has been added a stabilizing amount of an azo aromatic compound to minimize the formation of corrosive chlorides.

4. A substantially non-aqueous phosphatizing solution consisting essentially of at least 85% by weight of a chlorohydrocarbon selected from the group consisting of trichloroethylene and perchloroethylene, from 0.3 to 1% by weight phosphoric acid and from 1 to 10% by weight of a lower aliphatic alcohol having from 3 to 8 carbon atoms to which has been added from 0.01 to 1% by weight of a compound selected from the group consisting of nitroso aromatic compounds and azo aromatic compounds.

5. A substantially non-aqueous phosphatizing solution consisting essentially of at least 85% by weight of a chlorohydrocarbon selected from the group consisting of trichloroethylene and perchloroethylene, from 0.3 to 1% by weight phosphoric acid and from 1 to 10% by weight of a lower aliphatic alcohol having from 3 to 8 carbon atoms to which has been added from 0.01 to 1% by weight of a nitroso aromatic compound.

6. The composition of claim 5 in which the nitroso aromatic compound is 5-nitroso-8-quinolinol.

7. A substantially non-aqueous phosphatizing solution consisting essentially of at least 85% by weight of a chlorohydrocarbon selected from the group consisting of trichloroethylene and perchloroethylene, from 0.3 to 1% by weight phosphoric acid and from 1 to 10% by weight of a lower aliphatic alcohol having from 3 to 8 carbon atoms to which has been added from 0.01 to 1% by weight of an azo aromatic compound.

8. The composition of claim 7 in which the azo aromatic compound is azobenzene.

References Cited in the file of this patent

UNITED STATES PATENTS

| | | |
|---|---|---|
| 2,043,257 | Missbach | June 9, 1936 |
| 2,121,012 | Britton et al. | June 21, 1938 |
| 2,336,071 | Clifford et al. | Dec. 7, 1943 |
| 2,789,070 | Copelin | Apr. 16, 1957 |
| 2,906,783 | Monroe et al. | Sept. 29, 1959 |
| 2,947,792 | Skeeters | Aug. 2, 1960 |

FOREIGN PATENTS

| | | |
|---|---|---|
| 765,522 | Great Britain | Jan. 9, 1957 |